United States Patent
Chiu et al.

(10) Patent No.: US 8,238,841 B2
(45) Date of Patent: Aug. 7, 2012

(54) WIRELESS TRANSCEIVER CHIP AND CALIBRATION METHOD THEREOF

(75) Inventors: Po-Yuan Chiu, Hsinchu (TW); Kuan-Hung Chen, Hsinchu (TW); Chan-Sheng Yang, Hsinchu (TW)

(73) Assignee: Airoha Technology Corp., Hsinchu (TW)

( * ) Notice: Subject to any disclaimer, the term of this patent is extended or adjusted under 35 U.S.C. 154(b) by 857 days.

(21) Appl. No.: 12/273,857

(22) Filed: Nov. 19, 2008

(65) Prior Publication Data

US 2009/0298441 A1 Dec. 3, 2009

(51) Int. Cl.
*H04B 1/44* (2006.01)

(52) U.S. Cl. ......... 455/78; 455/82; 455/62; 455/63.1; 455/550.1; 455/102; 455/552.1; 455/103; 455/132; 455/101; 337/167; 361/119; 361/56; 333/1

(58) Field of Classification Search .......... 455/78, 455/82, 83, 62, 63.1, 59, 550.1, 102, 552.1, 455/103, 101; 337/167; 361/119, 56; 333/1
See application file for complete search history.

(56) References Cited

U.S. PATENT DOCUMENTS

| | | | |
|---|---|---|---|
| 5,722,040 A | 2/1998 | Bjerede et al. | |
| 7,492,565 B2 * | 2/2009 | Block et al. | 361/119 |
| 7,522,887 B2 * | 4/2009 | Nagano et al. | 455/78 |
| 7,729,724 B2 * | 6/2010 | Rofougaran et al. | 455/552.1 |
| 2001/0005685 A1 * | 6/2001 | Nishimori et al. | 455/562 |
| 2002/0090974 A1 * | 7/2002 | Hagn | 455/552 |
| 2004/0023621 A1 * | 2/2004 | Sugar et al. | 455/103 |
| 2004/0113747 A1 * | 6/2004 | Kelcourse | 337/167 |
| 2004/0209579 A1 * | 10/2004 | Vaidyanathan | 455/101 |
| 2006/0223456 A1 * | 10/2006 | Ouzillou | 455/78 |
| 2007/0066243 A1 * | 3/2007 | Yamauchi et al. | 455/78 |

FOREIGN PATENT DOCUMENTS

CN 1801644 A 7/2006

* cited by examiner

*Primary Examiner* — April G Gonzales
(74) *Attorney, Agent, or Firm* — Muncy, Geissler, Olds & Lowe, PLLC

(57) ABSTRACT

A wireless transceiver chip and calibration method thereof are disclosed. The wireless transceiver chip comprises at least one receiver, at least one transmitter, and at least one switch. The switch is connected to the receiver and the transmitter respectively for being applied to switch between the receiver and the transmitter. Practically, the switch is provided within the wireless transceiver chip, such that the pin count of the wireless transceiver chip can be reduced.

13 Claims, 9 Drawing Sheets

WIRELESS TRANSCEIVER CHIP AND CALIBRATION METHOD THEREOF

BACKGROUND OF THE INVENTION

1. Technical Field

The present invention is related to a wireless transceiver chip, wherein a switch is integrated into the wireless transceiver chip for reducing the pin count of the chip.

2. Description of the Prior Art

Referring to FIG. 1, a block diagram of the wireless transceiver chip according to the prior art is showed. The wireless transceiver chip 10 comprises a receiver 11 and a transmitter 13, wherein the receiver 11 and the transmitter 13 are connected to the switch 15 through the different pins of the wireless transceiver chip 10. That is, the switch 15 is provided on the external of the wireless transceiver chip 10, and the receiver 11 is connected to the switch 15 through the first pin 171 of the wireless transceiver chip 10, as well as, the transmitter 13 is connected to the switch 15 through the second pin 173 of the wireless transceiver chip 10.

The switch 15 is further connected to the baseband chip 19 for switching between the receiver 11 and the transmitter 13. Thereby, the signal from the wireless transceiver chip 10 can be sent to the baseband chip 19 via the path 1, and the signal from the baseband chip 19 can be sent to the wireless transceiver chip 10 via the path 2.

However, due to the pin count of the wireless transceiver chip 10 is too large, the wireless transceiver chip 10 has various problems, for example, the chip size of the wireless transceiver chip 10 can't be reduced easily, as well as, the circuit layout of wireless transceiver chip 10 is more difficult.

SUMMARY OF THE INVENTION

It is a primary object of the present invention to provide a wireless transceiver chip, which comprises a transmitter, a receiver, and a switch, and all of that are provided within a signal chip for advantageously reducing the pin count of the wireless transceiver chip.

It is a secondary object of the present invention to provide a wireless transceiver chip, which comprises a plurality of transmitters, receivers, and switches, wherein the corresponding transmitter and the receiver are connected to the different switches, such that the calibration process of the wireless transceiver chip can be proceeded.

It is another object of the present invention to provide a wireless transceiver chip, wherein the switch is provided within the chip, such that the switch can be controlled directly for data transmission between the wireless transceiver chip and the baseband chip.

It is still another object of the present invention to provide a calibration method for the wireless transceiver chip, wherein the transmitter and the corresponding receiver are connected to different switches, such that the pattern signal can be inputted and outputted via different switches, and the calibration process of the wireless transceiver chip can be achieved.

According to the above objects, a wireless transceiver chip, comprising: at least one receiver; at least one transmitter; at least one switch provided within the wireless transceiver chip, and connected to the receiver and the transmitter wherein the switch is used for switching between the receiver and the transmitter, thereby, the wireless transceiver chip and a baseband chip can communicate with each other, wherein the baseband chip is provided on the external of the wireless transceiver chip.

According to the above objects, a calibration method for the wireless transceiver chip, comprising the steps of: transmitting a first pattern signal to the first transmitter to further generate a calibration result of the first transmitter; transmitting a second pattern signal to the first receiver through the first transmitter to further generate a calibration result of the first receiver; transmitting a third pattern signal to the second transmitter to further generate a calibration result of the second transmitter; and transmitting a fourth pattern signal to the second receiver through the second transmitter to generate a calibration result of the second receiver.

The present invention can be best understood through the following description and accompanying drawings.

DETAILED DESCRIPTION OF THE PREFERRED EMBODIMENTS

Figure 1:
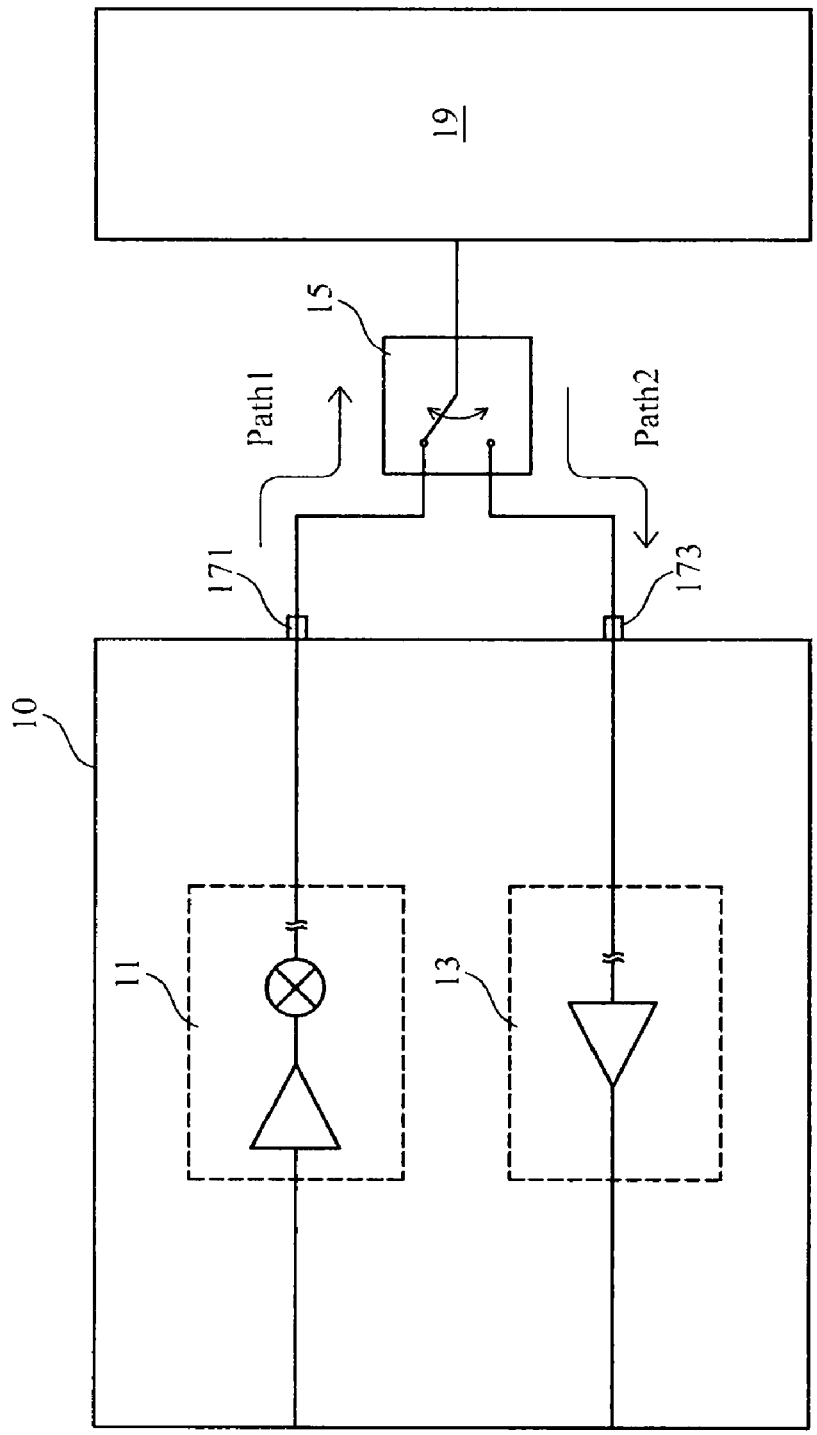
FIG. 1 is a block diagram of the wireless transceiver chip according to the prior art.
Figure 2:
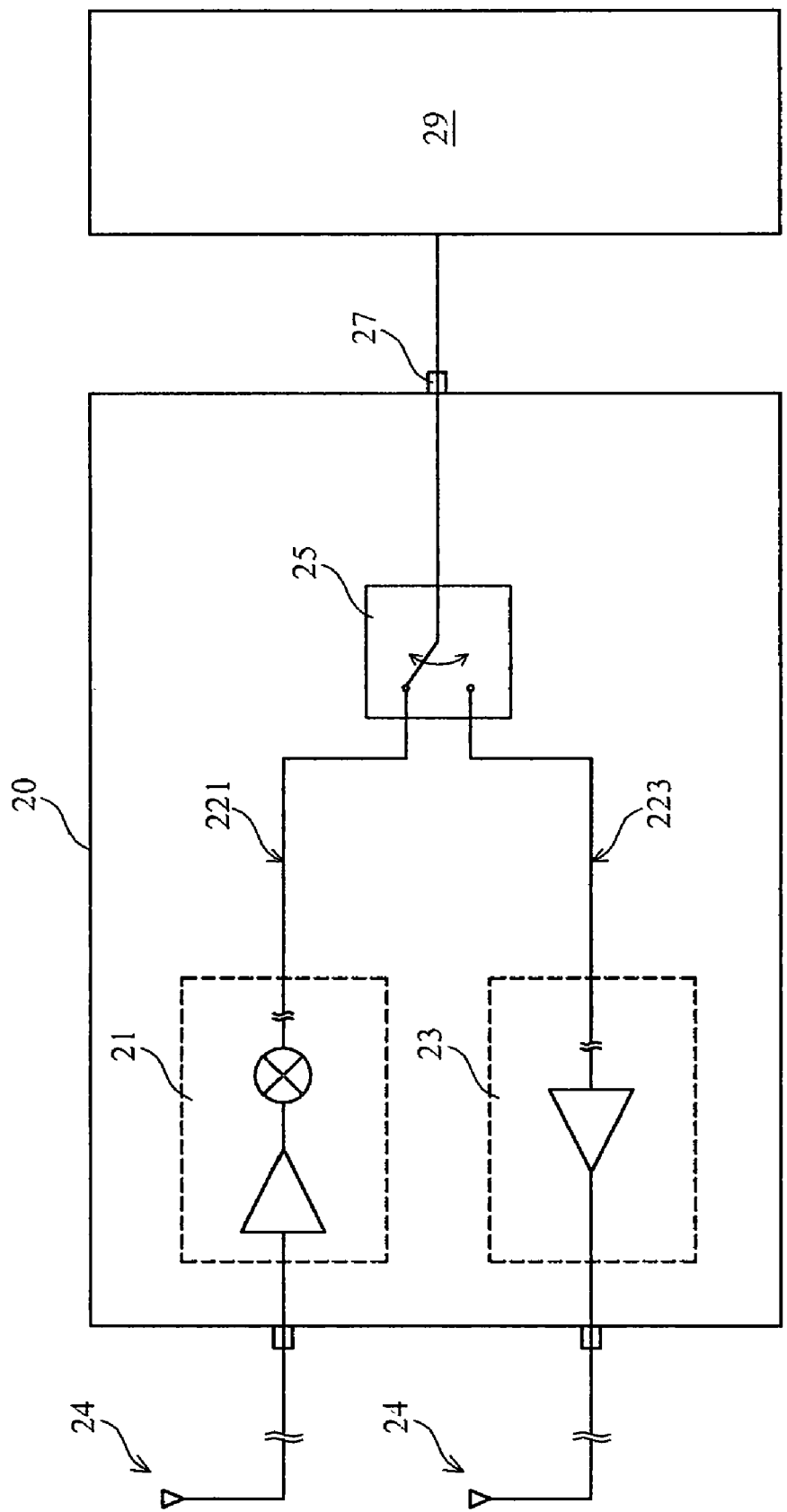
FIG. 2 is a block diagram showing a wireless transceiver chip according to the preferred embodiment of the present invention.

Referring to FIG. 2, a block diagram showing a wireless transceiver chip according to the preferred embodiment of the present invention is disclosed. The wireless transceiver chip 10 comprises a receiver 21, a transmitter 23, and a switch 23, wherein the switch 25 is provided within the wireless transceiver chip 20, and respectively connected to the receiver 21, the transmitter 23. The baseband chip 29, which is provided on the external of the wireless transceiver chip 20, such as the receiver 21 is connected to the switch 25 through at least one receiving path 221, as well as, the transmitter 23 is connected to the switch 25 through at least one transmitting path 223, and further, the switch 25 can be used for switching between the receiver 21 and the transmitter 23, thereby, the wireless transceiver chip 10 and the baseband chip 29 can transmit data between each other accordingly.

The wireless transceiver chip 20 is connected to a baseband chip 29 through the pin 27 of the wireless transceiver chip 20 for data transmission. According to the switch 25, the receiver 21 can be connected to the baseband chip 29 through the receiving path 221, the switch 25, and the pin 27 for transmitting data to the baseband chip 29 from the receiver 21, otherwise, the transmitter 23 can be connected to the baseband chip 29 through the transmitting path 223, the switch 25, and the pin 27 for transmitting data to the transmitter 23 from the baseband chip 29.

The wireless transceiver chip 20 is further connected to at least one antenna 24 for receiving and transmitting wireless signal. For example, the wireless signal (analog signal) received by the antenna 24 can be amplified and down converted, thereafter, it will be sent to the baseband chip 29. Besides, the analog signal that is sent from the baseband chip 29 will be up converted, subsequently, it will be sent to the antenna 24 for transmitting wireless signal. That is, the wireless transceiver chip 20 is used for proceeding the analog signal, and the baseband chip 29 is used for proceeding the digital signal and converting the signal between the digital signal and the analog signal. Mainly, the switch 25 is provided within the wireless transceiver chip 20, thereby, the pin 27 count of the wireless transceiver chip 20 can be reduced, as well as, the chip size of which can be reduced accordingly.

Figure 3:
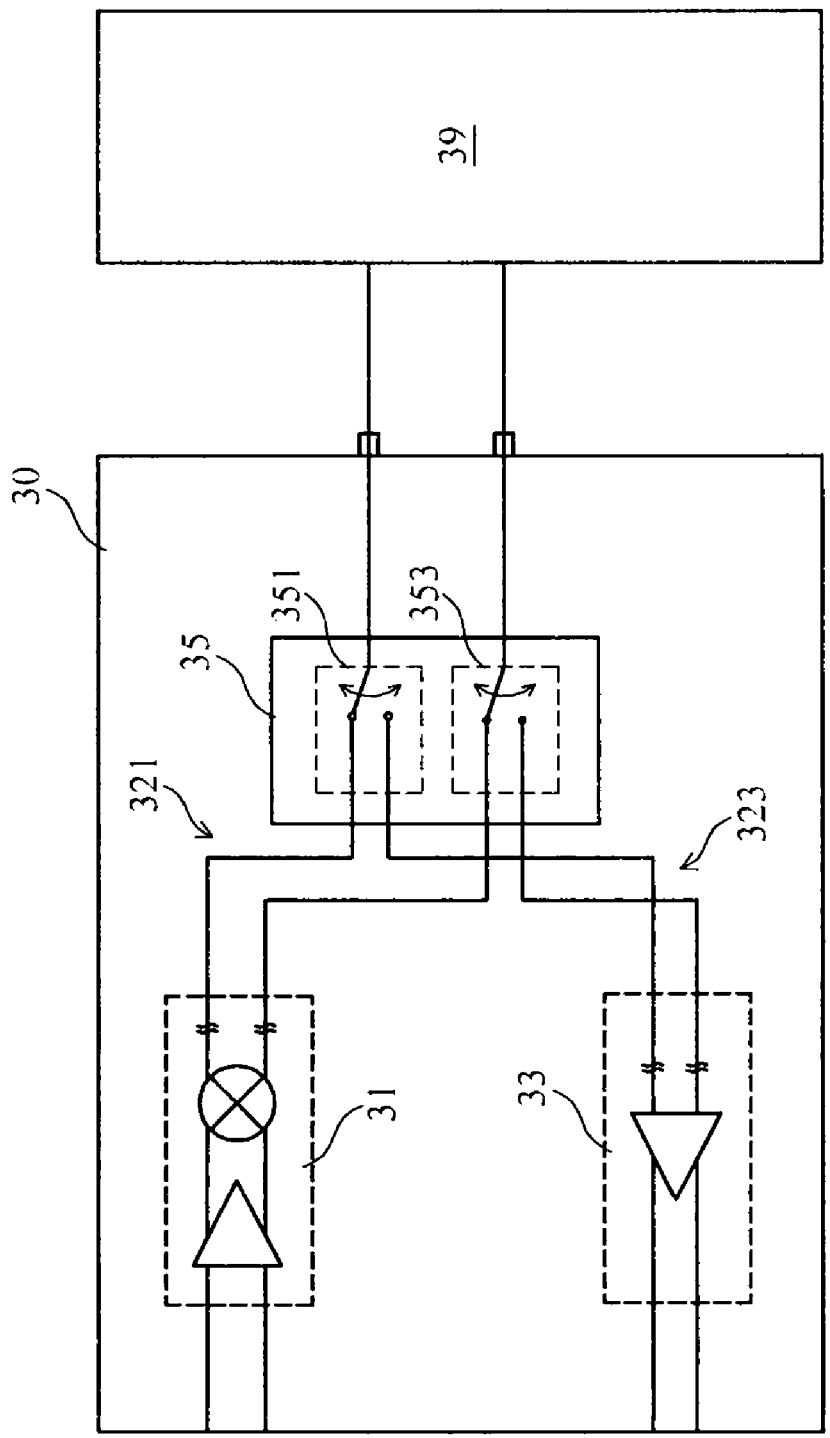
FIG. 3 is a block diagram showing a wireless transceiver chip according to another preferred embodiment of the present invention.

Referring to FIG. 3, a block diagram showing a wireless transceiver chip according to another preferred embodiment of the present invention is disclosed. The wireless transceiver chip 30 comprises a receiver 31, a transmitter 33, and a switch 35, wherein the switch 35 comprises two sub-switches, such as the first sub-switch 351 and the second sub-switch 353. The switch 35 is connected to the receiver 31 and the transmitter 33 through the receiving paths 321 and the transmitting paths 323.

According to the embodiment of the present invention, there are two receiving paths 321 and the transmitting paths 323, for example, the receiving paths 321 and the transmitting paths 323 are connected to the first sub-switch 351 and the second sub-switch 353 respectively, and the switch 35 can be used for switching between the receiving paths 321 and the transmitting paths 323, thereby, the receiver 31 or the transmitter 33 can be connected to the baseband chip 39 for data transmission between the wireless transceiver chip 30 and the baseband chip 39.

Figure 4:
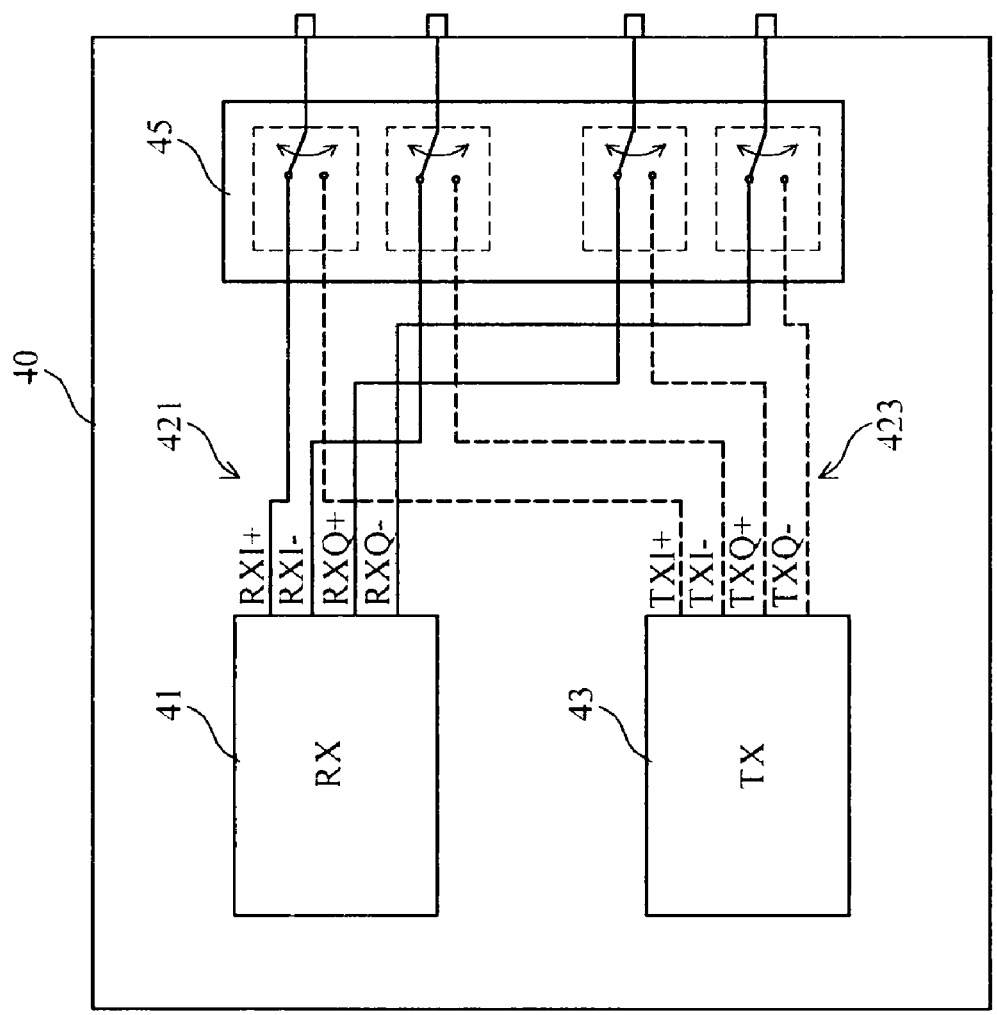
FIG. 4 is a block diagram showing a wireless transceiver chip according to another preferred embodiment of the present invention.

Referring to FIG. 4, a block diagram showing a wireless transceiver chip according to another preferred embodiment of the present invention is disclosed. The wireless transceiver chip 40 comprises a receiver 41, a transmitter 43, and a switch 45, wherein the switch 45 comprises four sub-switches which are connected to the receiver 41 and the transmitter 43 through the receiving paths 421 and the transmitting paths 423 respectively.

According to the embodiment of the present invention, there are four receiving paths 421 and the transmitting paths 423, for example, the receiving paths 421 comprises RXI+/RXI−/RXQ+/RXQ−, as well as, the transmitting path 423 comprises TXI+/TXI−/TXQ+/TXQ−. The RXI+/RXI−/RXQ+/RXQ− of the receiving path 421 and the TXI+/TXI−/TXQ+/TXQ− of the transmitting path 423 are connected to the four sub-switches provided within the switch 45 respectively, thereby, the switch 45 can be used for switching between the receiver 41 and the transmitter 43.

Figure 5:
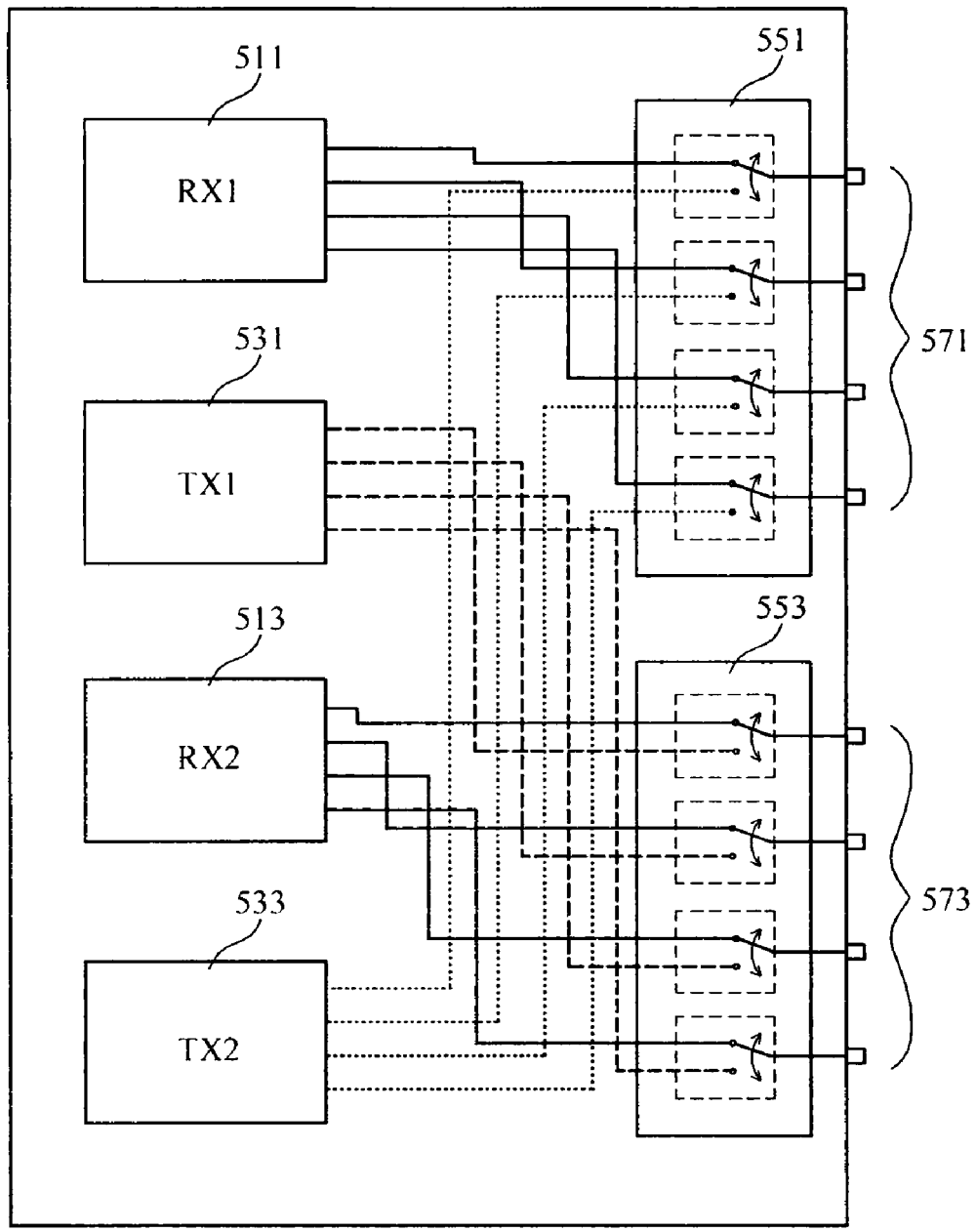
FIG. 5 is a block diagram showing a wireless transceiver chip according to another preferred embodiment of the present invention.

Referring to FIG. 5, a block diagram showing a wireless transceiver chip according to another preferred embodiment of the present invention is disclosed. In the embodiment the amounts of the receivers 51, the transmitters 53, and the switches 55 are two; nevertheless, the amounts of which can be more than two as well and more particularly which is a plurality.

The wireless transceiver chip 50 comprises a plurality of receivers 51. transmitters 53, and switches 55. The amounts of the receivers 51, the transmitters 53, and the switches 55 are the same, wherein the receivers 51 and the corresponding transmitters 53 can be connected to different switches 55 respectively. For example, the receiver 51 comprises a first receiver 511 and a second receiver 513, the transmitter 53 comprises a first transmitter 531 and a second transmitter 533, and the switch 55 comprises a first switch 551 and a second switch 553. The first transmitter 531 will be connected to the second switch 553, while the first receiver 511 is connected to the first switch 551; the second transmitter 533 will be connected to the first switch 551, while the second receiver 513 is connected to the second switch 553. That is, the first receiver 511 and the first transmitter 531 are connected to different switches, as well as, the second receiver 513 and the second transmitter 533 are connected to different switches, thereby, the calibration of the wireless transceiver chip 50 can be achieve. For example, the transmitting process, receiving process, and calibrating process can be proceeded according to the first switch 551 and the second switch 553.

The wireless transceiver chip 50 comprises a first pin 571 and a second pin 573, wherein the amounts of the first pins 571 and the second pins 573 are the same with the amount of the sub-switches provided within the switch 55. For example, since the switch 55 comprises four sub-switches, the amounts of the first pins 571 and the second pins 573 are four as well.

Figure 6A:
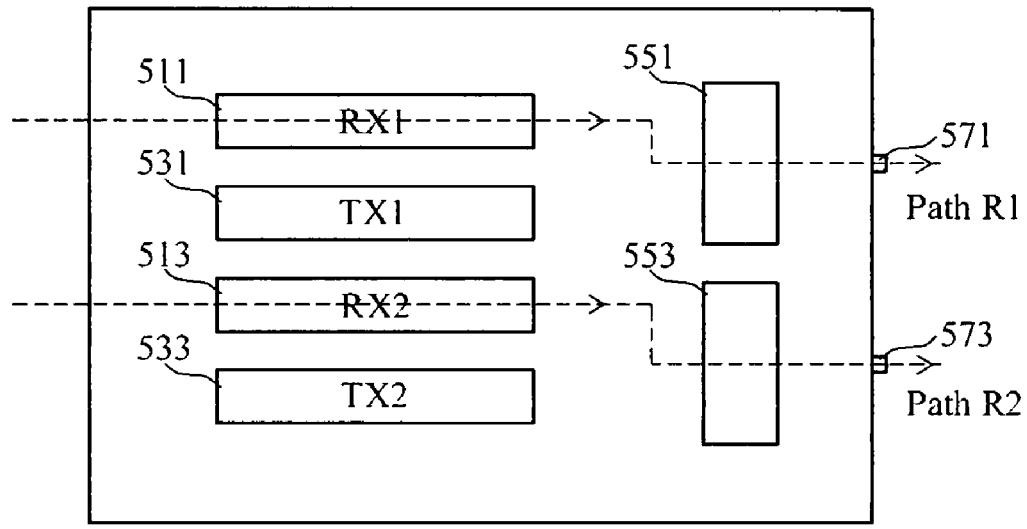
FIG. 6A and FIG. 6B are block diagrams showing the paths of the signal transmitting and receiving for the wireless transceiver chip according to the preferred embodiment of the present invention.
Figure 6B:
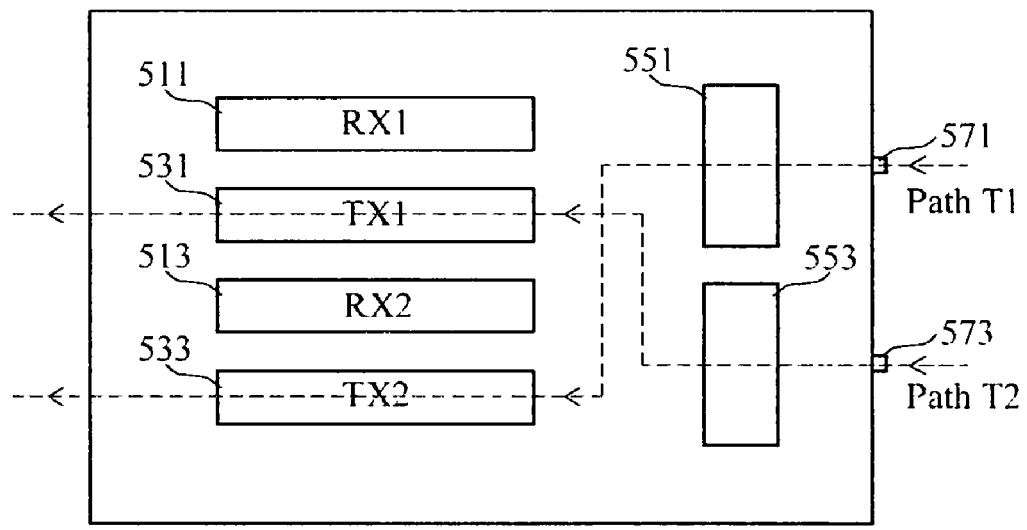

Referring to FIG. 6A and FIG. 6B, block diagrams showing the paths of the signal transmitting and receiving for the wireless transceiver chip according to the preferred embodiment of the present invention are disclosed. The wireless transceiver chip 50 comprises two receivers 51, two transmitters 53, and two switches 55 according to this embodiment, nevertheless, the amounts of the receivers 51, transmitters 53, and switches 55 can be more than two, and more particularly which is a plurality, wherein the receiver 51 and the corresponding transmitter 53 arc connected to different switches 55 respectively.

The receiver 51 comprises a first receiver 511 and a second receiver 513, the transmitter 53 comprises a first transmitter 531 and a second transmitter 533, as well as, the switch 55 comprises a first switch 551 and a second switch 553. The first transmitter 531 will be connected to the second switch 553, while the first receiver 511 is connected to the first switch 551; the second transmitter 533 will be connected to the first switch 551, while the second receiver 513 is connected to the second switch 553. That is, the first receiver 511 and the first transmitter 531 are connected to different switches, as well as, the second receiver 513 and the second transmitter 533 are connected to different switches.

While the wireless transceiver chip 50 are receiving the data, the signal will be sent to the first switch 551 from the first receiver 511, and outputted from the first pin 571, such as the first receiving path R1 shown on FIG. 6A, otherwise, the signal will be sent to the second switch 553 from the second receiver 513, and outputted from the second pin 573, such as the second receiving path R2 shown on FIG. 6A.

While the wireless transceiver chip 50 are transmitting the data, the signal will be inputted from the first pin 571, and sent to the second transmitter 533 through the first switch 551, such as the first transmitting path T1 shown on FIG. 6B, otherwise, the signal will be inputted from the second pin 573, and sent to the first transmitter 531 through the second switch 553, such as the second transmitting path T2 shown on FIG. 6B.

The switch, such as the first switch 551 and/or the second switch 553, is used for switching the path, such as the foregoing mentioned the first receiving path R1, the second receiving path R2, the first transmitting path T1, and the second transmitting pith T2. Alternatively, the connection of the receiver 51, the transmitter 53 and the switch 55 can be altered, such that the transmitting path and the receiving path will be altered accordingly. For example, the first receiver 511 is connected to the second switch 553, the second receiver 513 is connected to the first switch 551, the first transmitter 531 is connected to the first switch 551, and the second transmitter 533 is connected to the second switch 553 . . . and so on.

Figure 7A:
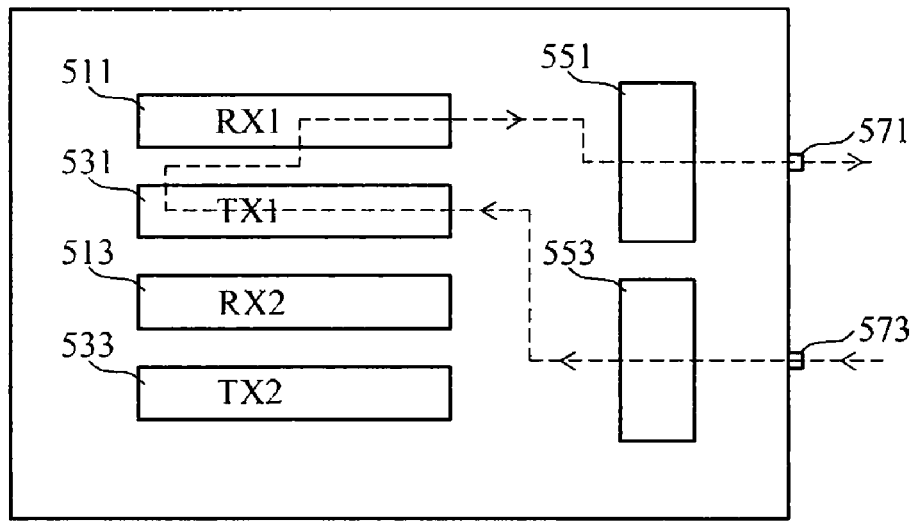
FIG. 7A and FIG. 7B are block diagrams showing the calibration paths for the wireless transceiver chip according to the preferred embodiment of the present invention.
Figure 7B:
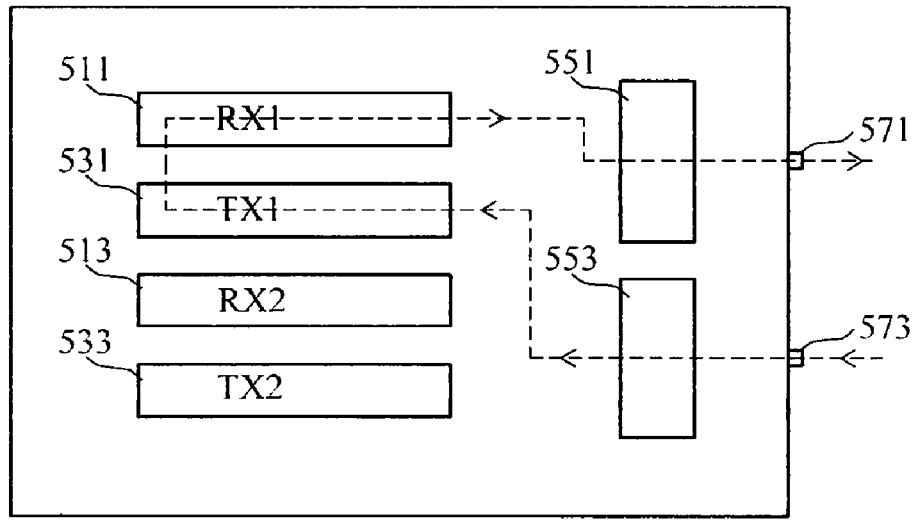
Figure 8A:
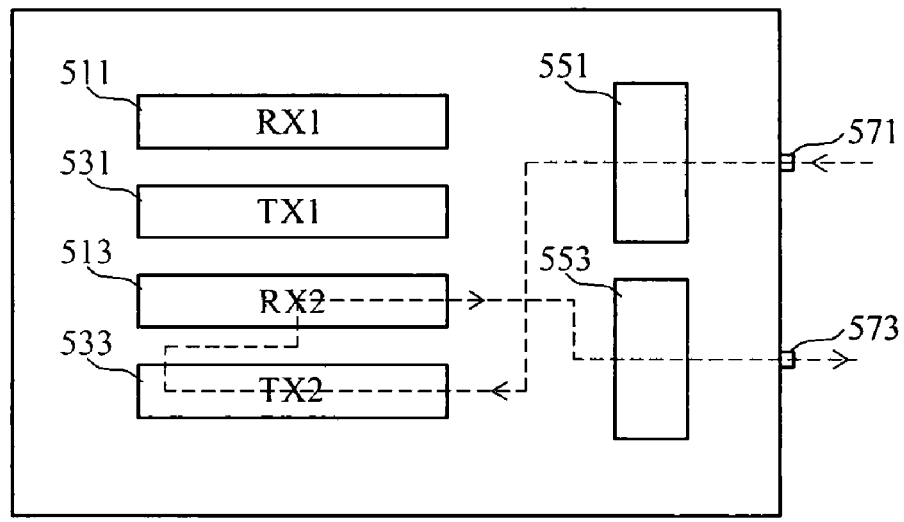
FIG. 8A and FIG. 8B are block diagrams showing the calibration paths for the wireless transceiver chip according to the preferred embodiment of the present invention.
Figure 8B:
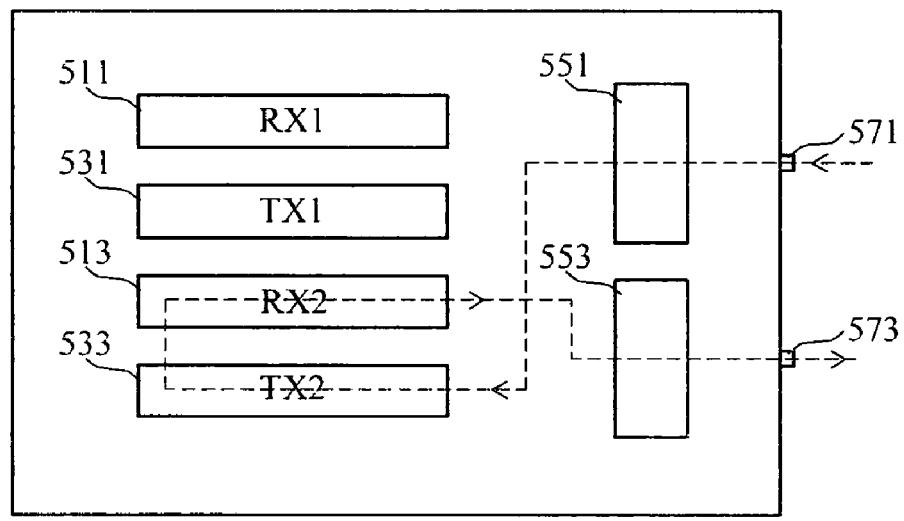

Referring to FIG. 7A, FIG. 7B. FIG. 8A, and FIG. 8B, block diagrams showing the calibration paths for the wireless transceiver chip according to the preferred embodiment of the present invention are disclosed. According to the present embodiment, the wireless transceiver chip 50 comprises two receivers 51 and two transmitters 53, and the calibration can be proceeded for the first transmitter 531, the first receiver 511, the second transmitter 533, and the second receiver 513, alternatively, the wireless transceiver chip 50 can comprise a plurality of receivers 51 and transmitters 53 as well, and the calibration can be proceeded for the transmitters 53 and receivers 51 accordingly.

The wireless transceiver chip 50 comprises a first transmitter 531, a first receiver 511, a second transmitter 533, and a second receiver 513. First, a first pattern signal (pattern 1) is sent to the first transmitter 531 to further generate a calibration result of the first transmitter 531. For example, the first pattern signal is inputted from the second pin 573, and sent to the first transmitter 531 through the second switch 553 for proceeding the calibration of the first transmitter 531. The calibration result of the first transmitter 531 will be outputted from the first pin 571 through the first receiver 511 and the first switch 551 in turn to achieve the calibration of the first transmitter 531 accordingly, as shown on FIG. 7A.

Thereafter, a second pattern signal (pattern 2) is sent to the first receiver 511 through the first transmitter 531 to further generate a calibration result of the first receiver 511. For example, the second pattern signal is inputted from the second pin 573, and sent to the first transmitter 531 and the first receiver 511 through the second switch 553 for proceeding the calibration of the first receiver 511. The calibration result of the first receiver 511 will be outputted from the first pin 571 through the first switching 551, as shown on FIG. 7B.

Furthermore, a third pattern signal (pattern 3) is sent to the second transmitter 533 to further generate a calibration result of the second transmitter 533. For example, the third pattern signal is inputted from the first pin 57 1, and sent to the second transmitter 533 through the first switch 551 for proceeding the calibration of the second transmitter 533. The calibration result of the second transmitter 533 will be outputted from the second pin 573 through the second receiver 513 and the second switch 553 in turn, as shown on FIG. 8A.

Moreover, a fourth pattern signal (pattern 4) will be sent to the second receiver 513 through the second transmitter 533 to further generate a calibration result of the second receiver 513. For example, the fourth pattern signal is inputted from the first pin 571, and sent to the second transmitter 533 and the second receiver 513 through the first switch 551 for proceeding the calibration of the second receiver 513. The calibration result of the second receiver 513 will be outputted from the second pin 573 through the second switching 553, a shown on FIG. 8B.

The foregoing mentioned calibration can be proceeded by switching the switch, that is, according to the switching of the first switch 551 and the second switch 553, the transmitting paths can be structured for the first pattern signal, the second pattern signal, the third pattern signal, and the fourth pattern signal. Accordingly, referring to the calibration process shown on FIG. 7A, FIG. 7B, FIG. 8A, and FIG. 8B, the calibration process for the wireless transceiver chip 50 is disclosed. Alternatively, the calibration order for the transmitter 53 and the receiver 51 can be altered. For example, the calibration of the second transmitter 533 and the second receiver 513 can be proceeded first, and further, the calibration of the first transmitter 531 and the first receiver 511 can be proceeded thereafter.

Figure 9:
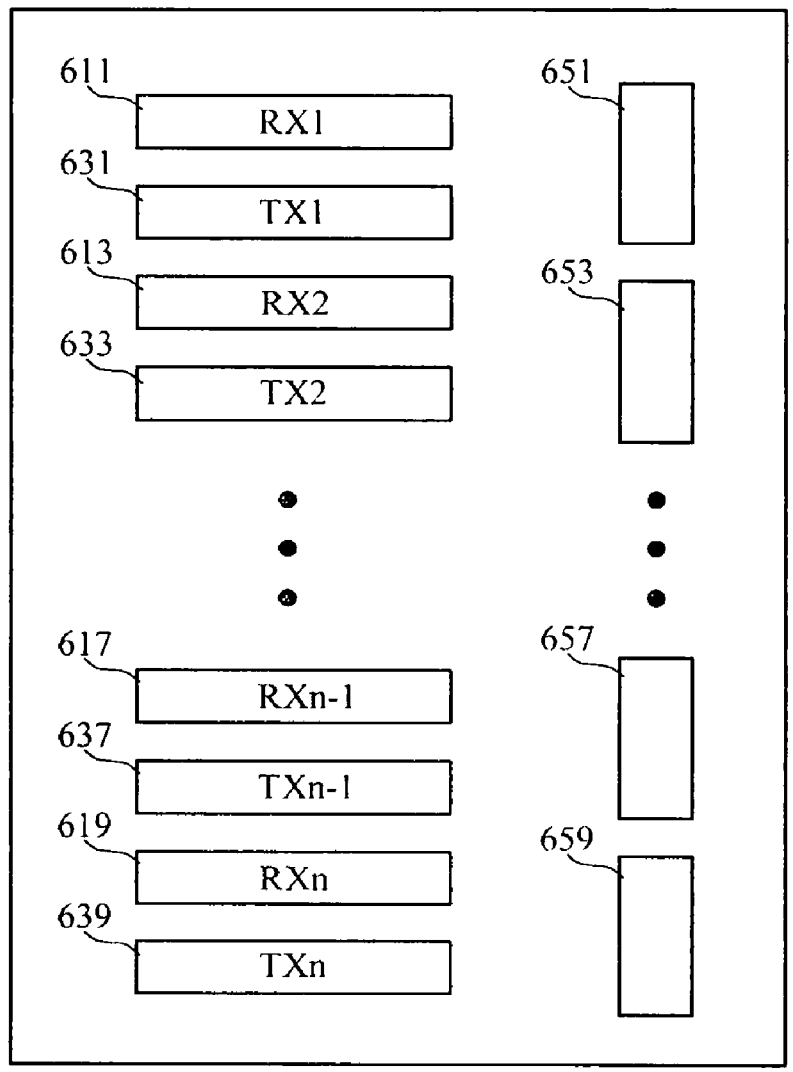
FIG. 9 is a block diagram showing a wireless transceiver chip according to another preferred embodiment of the present invention.

Referring to FIG. 9, a block diagram showing a wireless transceiver chip according to another preferred embodiment of the present invention is disclosed. The wireless transceiver chip 60 comprises more than two receivers 61 and transmitters 63. Similarly, the calibration of the receivers 61 and the transmitters 63 can be proceeded according to the foregoing mentioned steps of calibration process shown on FIG. 7A, FIG. 7B, FIG. 8A, and FIG. 8B.

According to this embodiment, the wireless transceiver chip 60 comprises a plurality of receivers 61, transmitters 63, and switches 65. For example, the wireless transceiver chip 60 including a plurality of receivers 61, transmitters 63, and switches 65, wherein the receivers comprise a first receiver 611, a second receiver 613 . . . , a (n−1)th receiver 617, and a nth receiver 619, the transmitters comprise a first transmitter 631, a second transmitter 633, . . . , a (n−1)th transmitter 637, and a nth transmitter 639, and the switches comprise a first switch 651, a second switch 653, . . . , a (n−1)th switch 657, and nth switch 659, and the number of n is a integer and larger than 4.

With respect to the wireless transceiver chip 60 that comprises more than two receivers 61 and transmitters 63, the calibration process can be proceeded for a plurality of receivers 61 and transmitters 63 simultaneously. For example, the calibration process for the first transmitter 631 and the (n−1)th transmitter 637, first receiver 611 and the (n−1)th receiver 617, the second transmitter 633 and the nth transmitter 639, as well as, the second receiver 613 and the nth receiver 619, can be proceeded simultaneously. Alternatively, the connection of the receiver 61, the transmitter 63, and the switch 65 can be altered as well.

The above embodiments are only used to illustrate the present invention, not intended to limit the scope thereof. Many modifications of the above embodiments can be made without departing from the spirit of the present invention.

What is claimed is:

1. A wireless transceiver chip, comprising:
    plurality of receivers;
    a plurality of transmitters; and
    a plurality of switches provided within said wireless transceiver chip, and connected to said receiver and said transmitters, wherein said switches is used for switching between said receivers and said transmitters, thereby, said wireless transceiver chip and a baseband chip can communicate with each other, wherein said baseband chip is provided on the external of said wireless transceiver chip,
    wherein the plurality of receivers comprises a first receiver and a second receiver, the plurality of transmitters comprises a first transmitter and a second transmitter, and the plurality of switches comprises a first switch and a second switch, and
    wherein said first receiver and said second transmitter are respectively connected to said first switch, and said second receiver and said first transmitter are respectively connected to said second switch.

2. The wireless transceiver chip of claim 1, wherein said receiver is connected to said switch via at least one receiving path, and said transmitter is connected to said switch via at least one transmitting path.

3. The wireless transceiver chip of claim 2, wherein said switch comprises two sub-switches, as well as, the amounts of said receiving paths and said transmitting paths are two.

4. The wireless transceiver chip of claim 2, wherein said switch comprises four sub-switches, as well as, the amounts of said receiving paths and said transmitting paths are four.

5. The wireless transceiver chip of claim 1, wherein the amounts of said receivers, said transmitters, and said switches are the same, and said receiver and the corresponding transmitter are connected to different switches respectively.

6. The wireless transceiver chip of claim 1, wherein said receiver comprises said first receiver, said second receiver, ..., a (n−1)th receiver, and a nth receiver, as well as, said transmitter comprises said first transmitter, said second transmitter, ..., a (n−1)th transmitter, and a nth transmitter.

7. The wireless transceiver chip of claim 6, wherein said receiver and the corresponding transmitter are connected to different switches respectively.

8. The wireless transceiver chip of claim 6, wherein said first receiver and first transmitter are connected to different switches, said second receiver and said second transmitter are connected to different switches, ..., said (n−1)th receiver and said (n−1)th transmitter are connected to different switches, and said nth receiver and said nth transmitter are connected to different switches.

9. A calibration method for the wireless transceiver chip of claim 1, comprising the steps of:
    transmitting a first pattern signal to said first transmitter to further generate a calibration result of said first transmitter;
    transmitting a second pattern signal to said first receiver through said first transmitter to further generate a calibration result of said first receiver;
    transmitting a third pattern signal to said second transmitter to further generate a calibration result of said second transmitter; and
    transmitting a fourth pattern signal to said second receiver through said second transmitter to generate a calibration result of said second receiver,
    wherein said first receiver and said second transmitter are connected to said first switch, and said first transmitter and said second receiver are connected to said second switch.

10. The calibration method of claim 9, wherein said wireless transceiver chip comprises a plurality of receivers and transmitters.

11. The calibration method of claim 10, wherein said receiver comprises a first receiver, a second receiver, ..., a (n−1)th receiver, and a nth receiver, as well as, said transmitter comprises a first transmitter, a second transmitter, ..., a (n−1)th transmitter, and a nth transmitter.

12. The calibration method of claim 1, comprising the steps of:
    outputting the calibration result of said first transmitter through said first receiver and said first switch in turn;
    outputting the calibration result of said first receiver through said first switch;
    outputting the calibration result of said second transmitter through said second receiver and said second switch in turn; and
    outputting the calibration result of said second receiver through said second switch.

13. The calibration method of claim 9, wherein said switch can be switched to form the transmitting paths of said first pattern signal, said second pattern signal, said third pattern signal, and said fourth pattern signal.

* * * * *